US006410929B1

(12) United States Patent
Nakamura et al.

(10) Patent No.: US 6,410,929 B1
(45) Date of Patent: Jun. 25, 2002

(54) ELECTRON BEAM IRRADIATION APPARATUS

(75) Inventors: Atsushi Nakamura; Takesi Yosioka; Masahiro Kiga, all of Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/585,347

(22) Filed: Jun. 2, 2000

(30) Foreign Application Priority Data

Jun. 4, 1999 (JP) .......................................... 11-157572

(51) Int. Cl.[7] .......................... G21K 5/00; G01M 23/00

(52) U.S. Cl. .................... 250/492.3; 250/311; 250/306; 250/492.2

(58) Field of Search ......................... 250/492.2, 492.22, 250/492.3, 306, 311

(56) References Cited

U.S. PATENT DOCUMENTS 4,189,641 A * 2/1980 Katagiri et al. ............. 250/311
5,065,302 A * 11/1991 Kanazawa ................... 363/37
5,111,380 A * 5/1992 Nilssen ....................... 363/132
5,962,995 A * 10/1999 Avnery ....................... 315/506

FOREIGN PATENT DOCUMENTS

JP 10-288700 10/1998

* cited by examiner

*Primary Examiner*—John R. Lee
*Assistant Examiner*—David A. Vanore
(74) *Attorney, Agent, or Firm*—Oblon, Spivak, McClelland, Maier & Neustadt, P.C.

(57) ABSTRACT

An electron beam irradiation apparatus has an electron accelerator for accelerating electrons emitted from an electron beam source to irradiate a target, and a power supply for supplying power of direct current having a high voltage to the electron accelerator. The power supply comprises an inverter device for transforming a commercial AC power output into an AC power output of a variable voltage, a DC power supply for stepping up a voltage of the AC power output of the inverter device, rectifying the stepped up voltage to a high DC voltage, and applying the high DC voltage to the electron accelerator, and a feedback control circuit for controlling the power output of the inverter device by detecting the high DC voltage and a current.

6 Claims, 4 Drawing Sheets

ELECTRON BEAM IRRADIATION APPARATUS

BACKGROUND OF THE INVENTION

1. Field of the Invention

The present invention relates to an electron beam irradiation apparatus which is employed for irradiating combustion exhaust gas discharged from thermal power stations or the like with an electron beam to remove toxic components from the exhaust gas, and more particularly to an arrangement of a power supply for applying a high voltage to an electron accelerator incorporated in the electron beam irradiation apparatus.

2. Description of the Related Art

It is considered that a global issue of the global warming and the acid rain caused by air pollution is attributed to components such as SOx and NOx which are contained in combustion exhaust gas discharged from thermal power stations or the like. As a method for removing toxic components such as SOx and NOx, there has been used a method of irradiating combustion exhaust gas with an electron beam for desulfurization and denitration (i.e. removing toxic components such as SOx and NOx).

FIG. 3 is a schematic view showing an electron beam irradiation apparatus for conducting the above method. An apparatus for treating combustion exhaust gas shown in FIG. 3 mainly comprises a power supply 10 for generating a high DC voltage from a commercial AC power supply, an electron accelerator 11 for accelerating electrons emitted from an electron beam source by applying a high voltage to the electrons and for irradiating a target with the electrons, and a combustion exhaust gas passage 19 disposed along an irradiation window 15 serving as an irradiation outlet of the electron beam from the electron accelerator 11. Molecules such as oxygen ($O_2$) and water vapor ($H_2O$) in the combustion exhaust gas are irradiated with the electron beam emitted from the irradiation window 15 comprising a thin film made of Ti or the like to form radicals such as OH, O, and $HO_2$ having high oxidizing strength. These radicals oxidize toxic components such as SOx and NOx to produce sulfuric acid and nitric acid as intermediate products. These intermediate products react with ammonia gas ($NH_3$) previously injected into the exhaust gas to produce ammonium sulfate and ammonium nitrate which are recovered as materials for fertilizer. Therefore, such a system for treating exhaust gas can remove toxic components such as SOx and NOx from the combustion exhaust gas and simultaneously recover ammonium sulfate and ammonium nitrate as useful by-products used for materials for fertilizer.

The electron accelerator 11 mainly comprises a thermoelectron generator 12 comprising a filament or the like, an accelerating tube 13 for accelerating electrons emitted from the thermoelectron generator 12, a focusing electromagnet 16 for controlling a radius of the electron beam by applying the magnetic field to the high-energy electron beam formed in the accelerating tube 13, and a scanning electromagnet 17 for deflecting the electron beam by applying the magnetic field to the electron beam whose radius is controlled by the focusing electromagnet 16. The accelerating tube 13 is housed in a container **18*b* and the interior of the accelerating tube 13 is kept under high vacuum condition. The high-energy electron beam formed by the accelerating tube 13 is deflected and scanned by the scanning electromagnet 17 which applies the magnetic field to the electron beam, and emitted through the irradiation window 15 into a certain range of the exhaust gas passage 19**.

FIG. 4 is a schematic view showing an arrangement of a conventional power supply incorporated in the electron beam irradiation apparatus shown in FIG. 3. The power supply 10 has input terminals 21 connected to the commercial AC power supply of a high voltage, e.g. 3300 V. This commercial AC voltage of 3300 V is applied to the input terminals 21 of the power supply 10. The AC voltage of 3300 V is obtained by stepping down an extra high tension voltage of 66000 V with a step-down transformer installed in a plant or the like. A harmonic suppression filter circuit 22 is connected to the input side of the power supply 10 to suppress the high-order harmonics formed by subsequent AC/DC converting. Since the fundamental frequency of the filter circuit 22 is 50 Hz or 60 Hz, the filter circuit 22 is required to be quite large in order that the third, fifth, and higher-order harmonics of the fundamental frequency should be suppressed so as not to affect the commercial AC power supply.

Circuit breakers 23 are disposed on the power supply lines and can break the circuit instantaneously in response to the signal from a controller 25. An induction voltage regulator (IVR) 24 is disposed in the downstream side of the circuit breakers 23. The IVR varies the AC output voltage by changing a flux linkage in accordance with an axial rotation driven by a motor, thus providing a kind of variable-voltage mechanisms. The output voltage is adjusted in the IVR 24 as follows: The DC output voltage Vo applied to the accelerating tube 13 is detected by a voltage detector 29, and the motor is rotated so as to keep the DC output voltage Vo detected by the voltage detector 29 constant. If an overcurrent is detected by a current detector 26 disposed in the downstream side of the IVR 24, then the circuit breakers 23 are opened by the controller 25. Thus, the protection from the overcurrent in the power supply 10 is achieved.

A step-up transformer 27 is connected to the downstream side of the IVR 24, and rectifying devices 28 are connected to the output of the step-up transformer 27. Each of the rectifying devices 28 produces a DC voltage of about 20 kV. The output DC voltage Vo of about 800 kV can be obtained as a whole by connecting these rectifying devices 28 in series. The DC output voltage Vo is divided by voltage dividing resistances 30 connected to the accelerating electrodes in the accelerating tube 13. The divided DC output voltages are applied to the accelerating electrodes for accelerating the electrons. On the other hand, a filament 31 for generating thermoelectrons is provided in the accelerating tube 13. An alternating current is supplied from an AC power supply 32 to the filament 31 to heat the filament 31 for thereby emitting the thermoelectrons therefrom. The thermoelectrons emitted from the filament 31 in the accelerating tube 13 are accelerated by the accelerating electrodes in the accelerating tube 13, passes through the irradiation window 15, and is emitted from the accelerating tube 13 to the outside as a high-energy electron beam E.

Such a conventional power supply for an electron beam irradiation apparatus has the following problems.

First, since the IVR is employed for adjusting the DC output voltage Vo, it is necessary that the motor is controlled to be rotated so as to keep the output voltage Vo constant against the variations of the input voltage of the commercial AC power supply. However, the rotational speed of the motor is too slow to follow an abrupt variation of the input voltage or the load. Therefore, the abrupt variation of the input voltage varies the output voltage Vo to thus weaken the lens effect of the accelerating tube, thus scattering the electron beam and causing an obstacle to the irradiation of the electron beam.

Secondly, when a DC power supply of a high voltage is used as a power supply, a local electric discharge or a short-circuit tends to occur between electrodes in the accelerating tube or near the rectifying devices. If such a local electric discharge occurs, an overcurrent flows in the circuit to break the rectifying elements such as diodes. Once the rectifying elements are broken, it is difficult to repair or replace the broken elements because they are immersed in insulating oil of a high-pressure tank and protected thereby, thus requiring high cost and a lot of time for restoring. Therefore, as soon as an overcurrent flows in the circuit, it is necessary to open the circuit breakers 23 and to stop applying a high DC voltage for thereby protecting the elements before they are broken. However, since it takes several tens of milliseconds from the detection of the overcurrent to the stop of the current for circuit breakers generally used, the elements are broken before the stop of the current.

Thirdly, since the power supply has the function of an AC/DC converter, a large number of variable-order harmonics are generated in the AC converter circuit. Accordingly, it is necessary to provide a large filter circuit 22 at the input side of the commercial AC power supply in order to suppress such harmonics.

In order to improve the speed of the IVR 24, the power supply may have a thyristor which is substituted for the IVR. Such a power supply changes the output voltage by controlling the firing angle of the thyristor. The power supply using a thyristor can change the output voltage at each cycle of the commercial AC power according to the variation of the input voltage. Therefore, the response to the variation of the input voltage is remarkably improved in comparison with the case in which an IVR is used. However, since the thyristor itself varies the voltage waveform of sinewave, more harmonics are formed, and hence a larger filter circuit is required.

SUMMARY OF THE INVENTION

The present invention has been made in view of the above drawbacks. It is therefore an object of the present invention to provide a power supply in an electron beam irradiation apparatus which can respond instantaneously to the variation of the input voltage and break the circuit instantaneously to protect the power supply when a short-circuit occurs in the parts to which a high DC voltage is applied.

According to an aspect of the present invention, there is provided an electron beam irradiation apparatus having an electron accelerator for accelerating electrons emitted from an electron beam source to irradiate a target, and a power supply for supplying power of direct current having a high voltage to the electron accelerator, the power supply comprising: an inverter device for transforming a commercial AC power output into an AC power output of a variable voltage; a DC power supply for stepping up a voltage of the AC power output of the inverter device, rectifying the stepped up voltage to a high DC voltage, and applying the high DC voltage to the electron accelerateor; and a feedback control circuit for controlling the power output of the inverter device by detecting the high DC voltage and a current.

With the above arrangement, since the inverter device outputting power output of a variable voltage steps up a voltage of the power output, rectifies the stepped up voltage to a high DC voltage, and applying the high DC voltage to the electron accelerator, even if the input voltage of the power supply varies, the output from the inverter device can be changed instantaneously. Therefore, the output voltage can be stabilized to conduct the irradiation of the electron beam stable. Further, if an electric discharge occurs in the parts to which a high voltage is applied, since the inverter device can stop the output thereof at each cycle of the carrier frequency signal as a unit, the output of the inverter device can be stopped off instantaneously within the next cycle from the time when the current of an electric discharge is detected. Accordingly, diode elements or voltage dividing resistance elements can be prevented from being broken, and hence a remarkably safe power supply can be obtained.

In a preferred aspect of the present invention, the electron beam irradiation apparatus further comprises a LC filter circuit disposed between the inverter device and the DC power supply.

With the above arrangement, the carrier frequency signal generated by the inverter device can be prevented from being transmitted to the DC power supply.

In a preferred aspect of the present invention, the electron beam irradiation apparatus further comprises a step-down transformer disposed between the inverter device and a commercial AC power supply, the step-down transformer having a delta-star connection and a delta-delta connection and connected to a converter disposed in the inverter device.

With the above arrangement, harmonics can be prevented from leaking into the commercial power supply. Therefore, the power supply can dispense with large filter.

In a preferred aspect of the present invention the inverter device is provided with a pulse-width modulation control on the basis of a result of comparing the voltage or current fed back at each cycle of a carrier frequency signal with a set value.

With the above arrangement, a quick response can be achieved.

The above and other objects, features, and advantages of the present invention will be apparent from the following description when taken in conjunction with the accompanying drawings which illustrates preferred embodiments of the present invention by way of example.

DETAILED DESCRIPTION OF THE PREFERRED EMBODIMENTS

Figure 1:
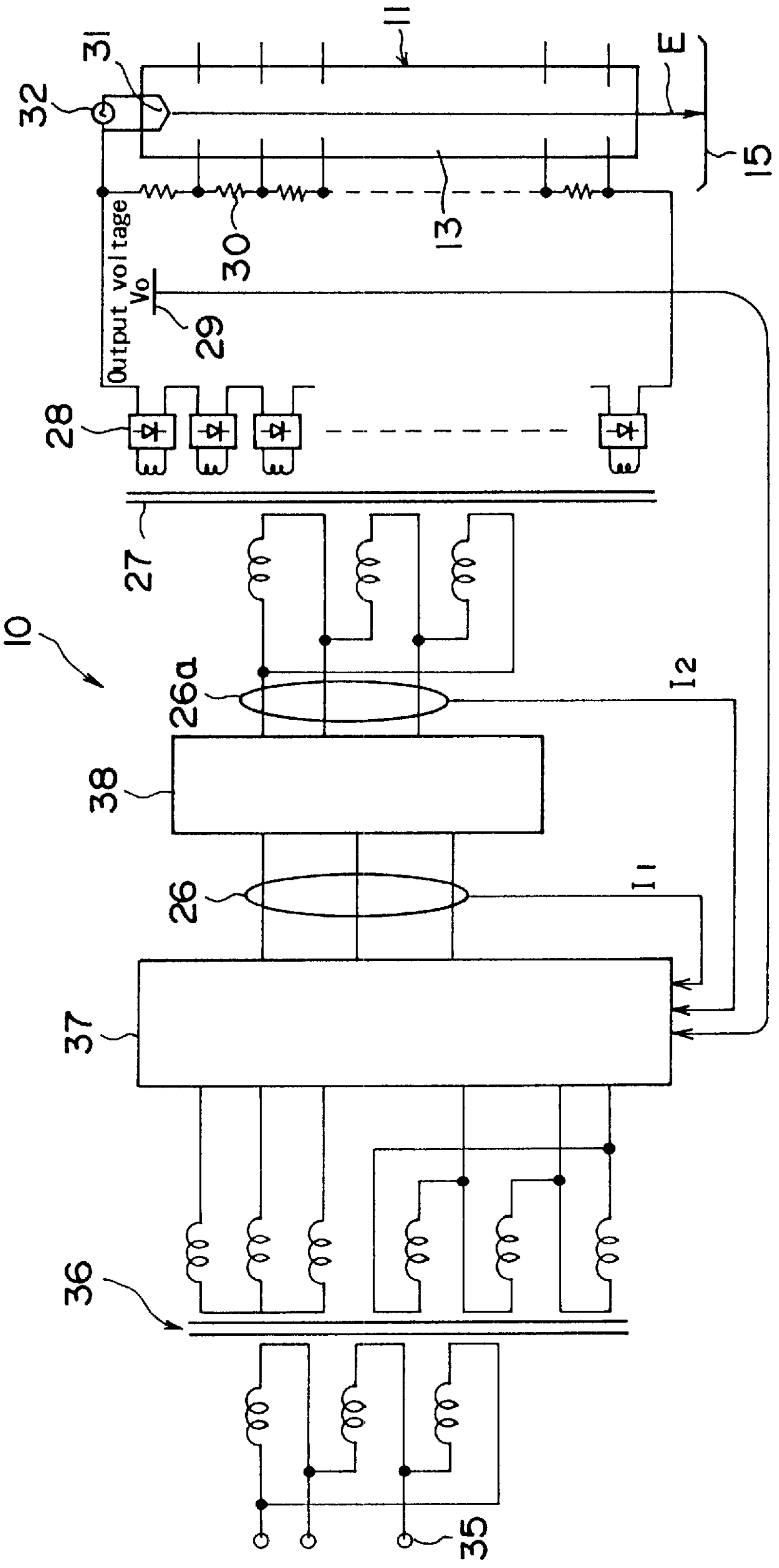
FIG. 1 is a circuit diagram showing a power supply according to an embodiment of the present invention.
Figure 2:
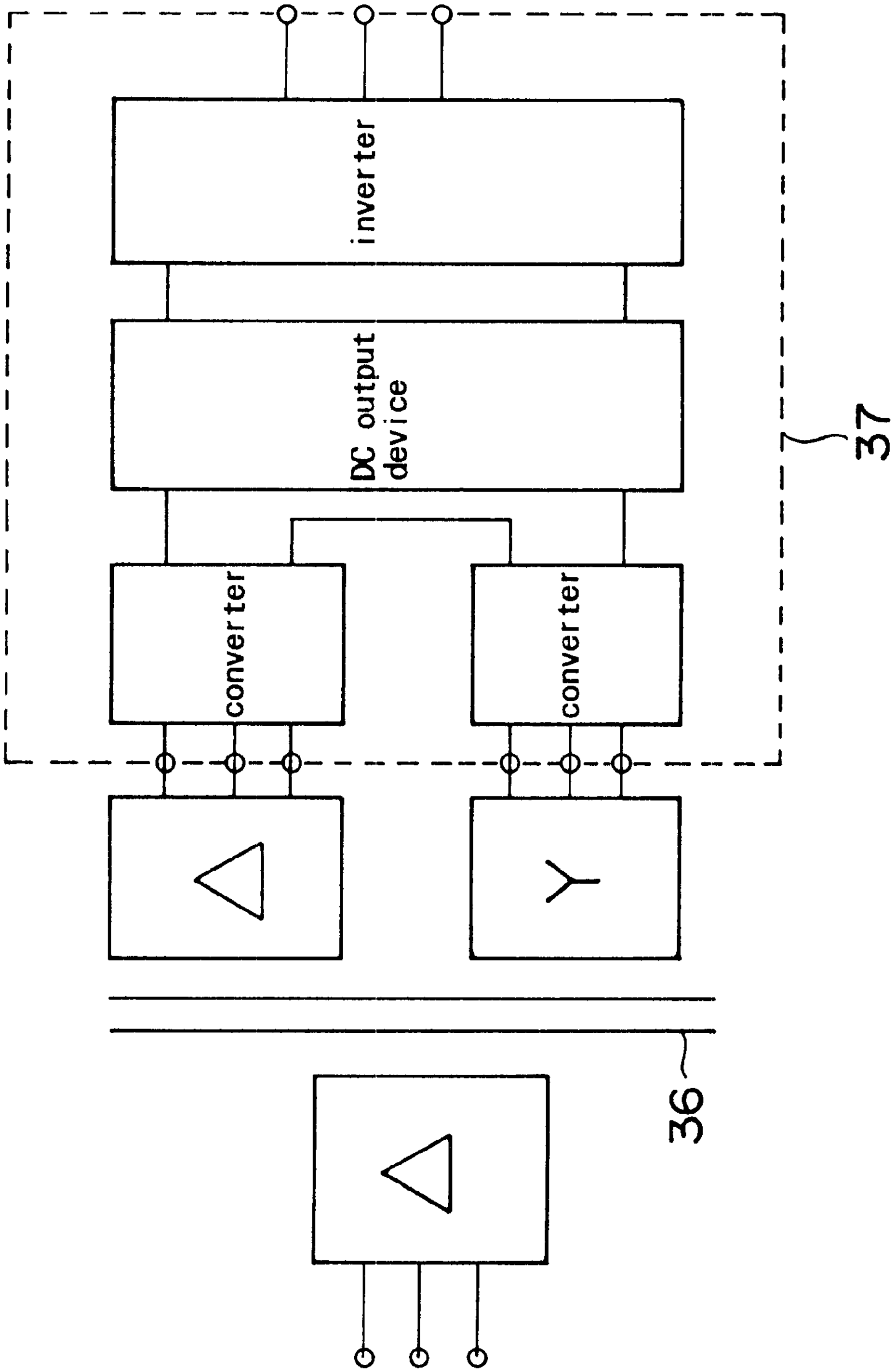
FIG. 2 is a block diagram showing connection between an isolation transformer and an inverter device according to an embodiment of the present invention.

An electron beam irradiation apparatus having a power supply according to an embodiment of the present invention will be described below with reference to FIGS. 1 and 2. In FIGS. 1 and 2, like components in the present invention are designated by the same reference numerals as those shown in FIGS. 3 and 4.

Figure 3:
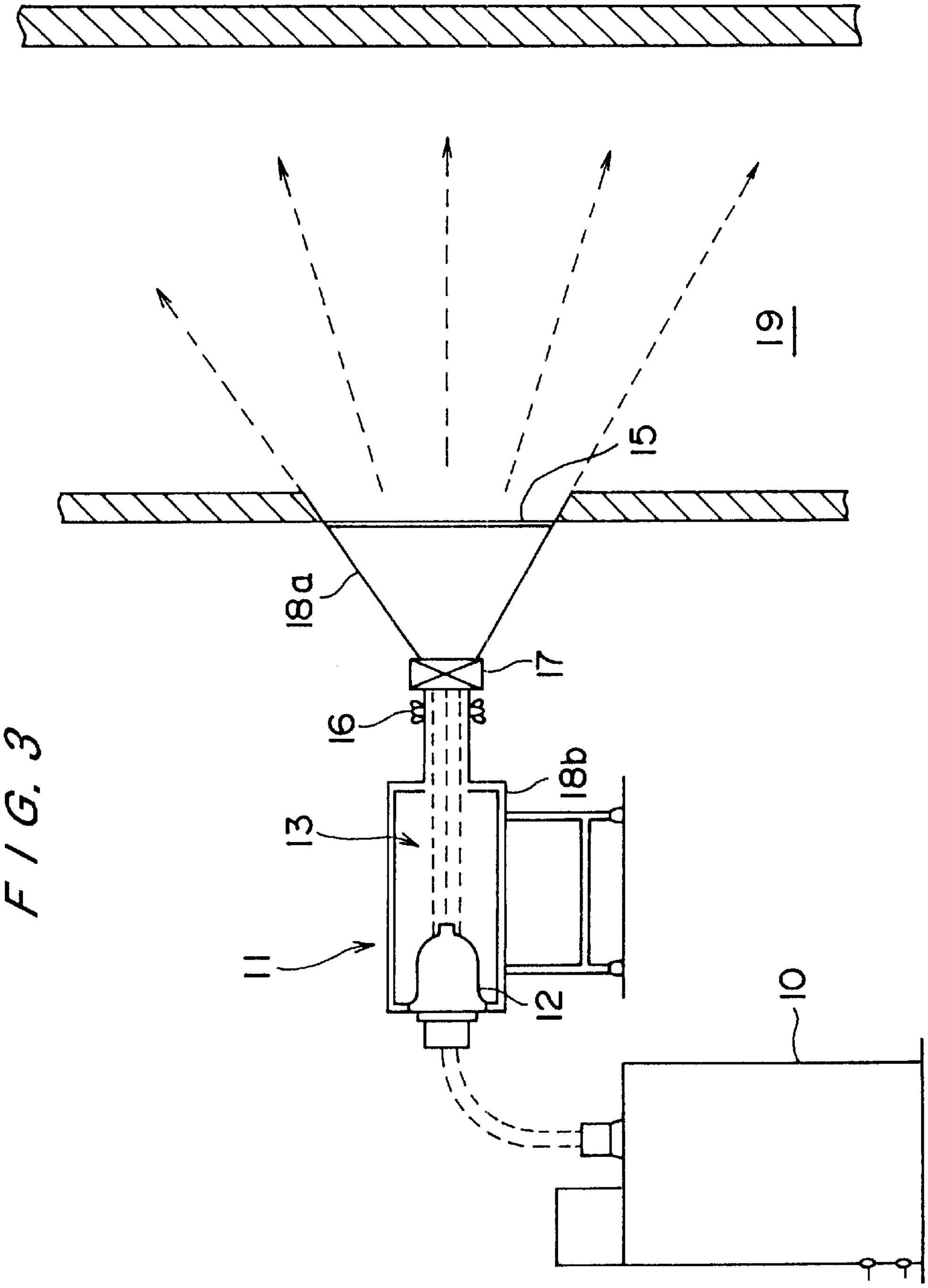
FIG. 3 is a schematic diagram showing an electron beam irradiation apparatus.
Figure 4:
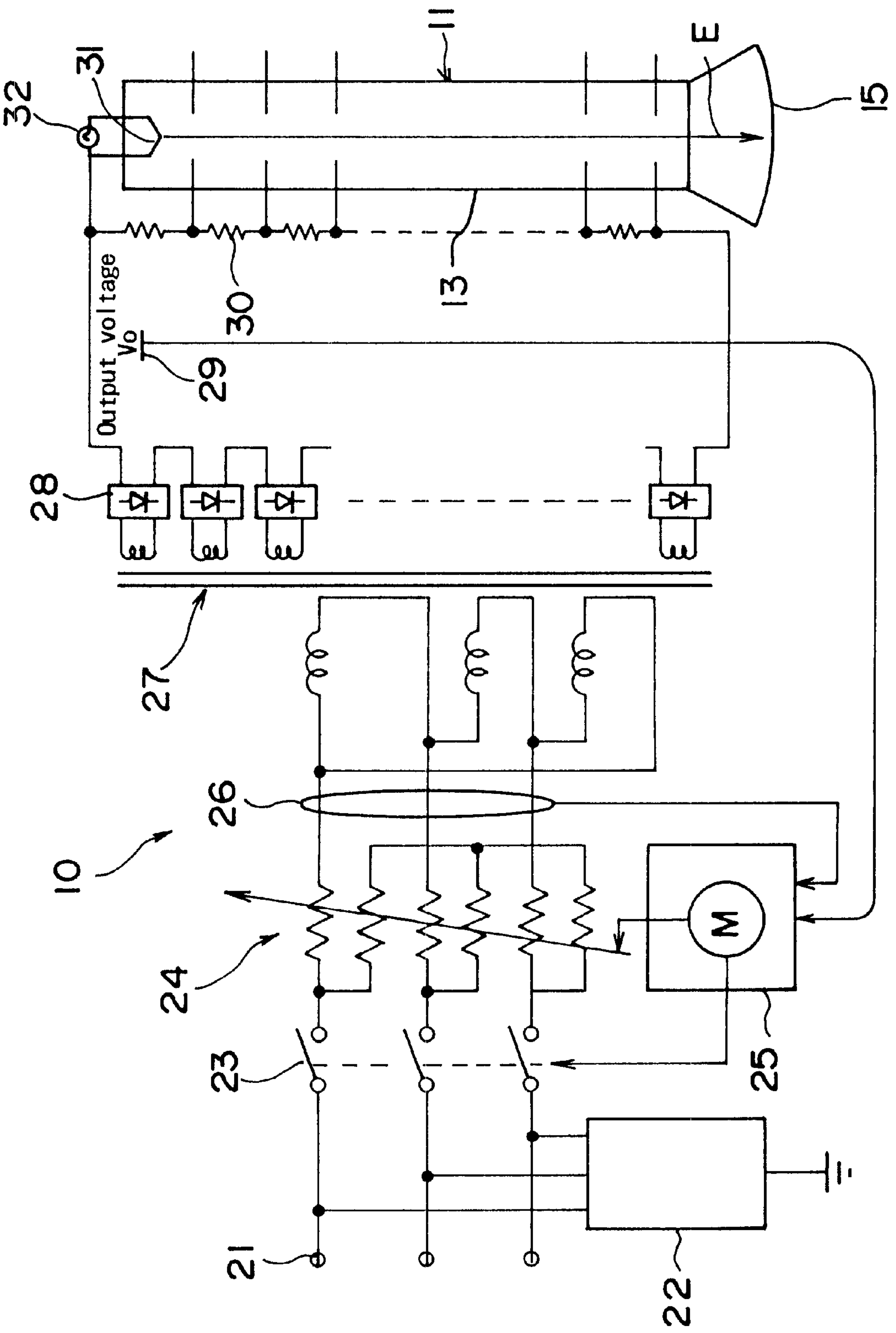
FIG. 4 is a circuit diagram showing an arrangement of a conventional power supply.

The electron beam irradiation apparatus has the same structure as that shown in FIG. 3 except for a power supply. A power supply shown in FIGS. 1 and 2 comprises a step-down transformer 36 for lowering an AC voltage of a commercial power supply from 6600 V to 3300 V, an inverter device 37 for transforming the lowered voltage of the commercial AC power supply into a desired AC voltage having a desired frequency, a LC filter 38 connected to the downstream side of the inverter device 37, a transformer 27 for stepping up the AC voltage outputted from the inverter device 37, and rectifying devices 28 for rectifying the stepped up AC voltage. The high DC voltage Vo is produced by a plurality of rectifying devices 28 connected in series. The rectifying devices 28 produces a high voltage of about 800 kV which is the sum of 20 kV produced by each rectifying device. The high DC output voltage Vo is applied via voltage dividing resistances 30 to each of accelerating electrodes in an accelerating tube 13.

The inverter device 37 adopts a so-called pulse-width modulation control, which controls the turn-on pulse width and the turn-off pulse width of the carrier frequency signal to form the desired waveform of the AC output voltage. In this control, a cycle of the carrier frequency signal can be a unit of the control. Thus, the AC output voltage can be switched on and off within each cycle of the carrier frequency signal as a unit. For example, if the carrier frequency is 2 kHz, then the cycle time of the carrier frequency signal is 0.5 millisecond, and hence the output voltage can be adjusted within the cycle of 0.5 millisecond as a unit. Specifically, when the inverter device 37 is commanded to stop off the output in a certain cycle, the inverter device 37 can output zero voltage at the next cycle.

The LC filter 38 is connected to the downstream side of the inverter device 37 and employed for preventing the carrier frequency signal having a high frequency from being transmitted into the step-up transformer 27.

The DC output voltage Vo is detected by a voltage detector 29 and the signal from the voltage detector 29 is transmitted into a controller in the inverter device 37. In the controller of the inverter device 37, the DC output voltage Vo is adjusted so as to be kept at a certain set value, e.g. 800 kV. Specifically, the output voltage is compared with the set value in each cycle of the carrier frequency signal in the inverter device 37 and controlled to make the deference between the output voltage and the set value zero by the feedback control. Accordingly, even if the input voltage of the commercial AC power supply varies, the output voltage can be controlled to follow the variation of the input voltage within a cycle of the carrier frequency signal.

Current detectors 26, 26*a* are disposed in the downstream side of the inverter device 37. The detected results by the current detectors are fed back to the controller in the inverter device 37. Accordingly, if an electric discharge in the parts to which a high voltage is applied in the power supply, an electric discharge at the accelerating electrodes in the accelerating tube 13, or a short-circuit occurs, then the current detectors 26, 26*a* can detect the abnormal current produced by the electric discharge or short-circuit. Then, the signal from the current detectors 26, 26*a* is transmitted into the controller in the inverter device 37. As described above, since the output voltage can be controlled at each cycle of the carrier frequency signal in the inverter device 37, as soon as the abnormality is detected by the current detector 26, 26*a*, the inverter device 37 can stop off the output. Specifically, the output can be stopped off within one or two cycles from the time when the abnormal current is detected. For example, if the carrier frequency is 2 kHz, the output can be stopped off within 1 millisecond. Thus, the power supply according to the present invention can prevent the rectifying devices such as diodes from being broken.

The primary of the step-down transformer 36 is connected to the commercial power supply of 6600 V AC. The secondary of the step-down transformer 36 lowers the voltage in electric power to 3300 V AC and then supplies the power to the inverter device. The transformer 36 has a delta connection at the primary, and a star connection and a delta connection in parallel at the secondary. As shown in FIG. 2, two rectifying circuits each comprising a converter are disposed in the inverter device and connected in series to DC output device forming a DC power supply. The DC supply supplies a direct-current power to a single inverter. Since a large number of semiconductor elements are used as the rectifying elements and the switching elements in the inverter device 37, it is preferable to use the voltage of about 3300 V because of a relatively low allowable voltage range. Inasmuch as the step-down transformer 36 has the delta-star connection and the delta-delta connection in parallel, the formation of the harmonics at the commercial AC power supply side can be completely suppressed. Hence, the power supply according to the present invention can dispense with the harmonic suppression filter 22 shown in FIG. 4 used in the conventional system. As described above, the conventional harmonic suppression filter 22 is employed for suppressing the 23rd or lower-order harmonics, for example, and requires a large space and cost. By removing such a filter, the cost reduction and the compactness of an electron beam irradiation apparatus can be achieved.

As described above, according to the present invention, a power supply in an electron beam irradiation apparatus comprises an inverter device. Therefore, the output can be controlled within each cycle of the carrier frequency signal in the pulse-width modulation control, and hence the power supply can ensure high stability and safe operation in which the output can be stopped off instantaneously. Thus, the electron beam irradiation apparatus can be operated stably and safely.

Although certain preferred embodiments of the present invention have been shown and described in detail, it should be understood that various changes and modifications may be made therein without departing from the scope of the appended claims.

What is claimed is:

1. An electron beam irradiation apparatus having an electron accelerator for accelerating electrons emitted from an electron beam source to irradiate a target, and a power supply for supplying power of direct current having a high voltage to said electron accelerator, said power supply comprising:

an inverter device for transforming a commercial AC power output into an AC power output of a variable voltage;

a DC power supply including a step-up transformer for stepping up a voltage of said AC power output of said inverter device, and a rectifying device for rectifying said stepped up voltage to a high DC voltage, said DC power supply applying said high DC voltage to said electron accelerator;

a voltage detector for detecting said high DC voltage;

a current detector for detecting an output current of said inverter device; and a feedback control circuit for controlling said power output of said inverter device by detecting said DC high voltage and said output current.

2. An electron beam irradiation apparatus according to claim 1, further comprising a LC filter circuit disposed between said inverter device and said DC power supply.

3. An electron beam irradiation apparatus according to claim 1, further comprising a step-down transformer disposed between said inverter device and a commercial AC power supply, said step-down transformer having a delta-star connection and a delta-delta connection and connected to a converter disposed in said inverter device.

4. An electron beam irradiation apparatus according to claim 1, wherein said inverter device controls a power output with a pulse-width modulation on the basis of a result of comparing the voltage or current fed back at each cycle of a carrier frequency signal with a set value.

5. An electron beam irradiation apparatus according to claim 1, wherein said feedback control circuit controls said inverter device so as to keep said high DC voltage at a certain set value when an input voltage of a commercial AC power supply varies.

6. An electron beam irradiation apparatus according to claim 1, wherein said feedback control circuit controls said inverter device so as to stop said power output thereof when said current detector detects an abnormal current produced by an electric discharge or a short-circuit in parts to which a high voltage is applied.

* * * * *

UNITED STATES PATENT AND TRADEMARK OFFICE

CERTIFICATE OF CORRECTION

PATENT NO. : 6,410,929 B1 
DATED : June 25, 2002
INVENTOR(S) : Nakamura et al.

It is certified that error appears in the above-identified patent and that said Letters Patent is hereby corrected as shown below:

Title page,
Item [75], the Inventor, should read:

-- [75] Inventors: Atsushi Nakamura; Takeshi Yoshioka; Masahiro Kiga; all of Tokyo (JP) --

Signed and Sealed this

Eleventh Day of February, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,410,929 B1
DATED : June 25, 2002
INVENTOR(S) : Atsushi Nakamura et al.

It is certified that error appears in the above-identified patent and that said Letters Patent is hereby corrected as shown below:

<u>Column 6,</u>
Line 44, after “high”, insert -- DC --;
Line 47, change “a commercial” to -- an --;
Line 48, change “output” (first occurrence) to -- input --;
Line 50, delete “a DC power supply including”;
Line 52, after “device” (first occurrence) but before the comma, insert -- to a stepped-up voltage --; after “for”, insert -- receiving said stepped-up voltage and for--;
Line 53, change “stepped up” to -- stepped-up --; change “a” to -- said --; after “voltage,” insert -- wherein --; delete “DC” (second occurrence);
Line 54, delete “power supply applying said”; after “voltage”, insert -- as applied --;
Line 57, delete “detector”, insert -- , distinct from said voltage detector, --; and
Line 61, change “DC high” to -- high DC --.

Signed and Sealed this

First Day of February, 2005

JON W. DUDAS
*Director of the United States Patent and Trademark Office*